(12) United States Patent
Kobayashi

(10) Patent No.: US 6,646,678 B1
(45) Date of Patent: Nov. 11, 2003

(54) PHOTOGRAPHING SYSTEM

(75) Inventor: Takashi Kobayashi, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/460,432

(22) Filed: Dec. 14, 1999

(30) Foreign Application Priority Data

Dec. 15, 1998 (JP) .......................................... 10-356398

(51) Int. Cl.⁷ ............................ H04N 5/225; H04N 7/18
(52) U.S. Cl. .................... 348/207.1; 348/61; 348/135; 348/342; 348/373; 396/79; 396/429
(58) Field of Search ..................... 348/61, 135, 207.99, 348/207.1, 211.99, 211.4, 211.5, 211.6, 222.1, 311, 320, 322, 324, 335, 340, 342, 345, 347, 351, 373–375, 362–364; 396/72, 77, 79, 89, 101, 166, 170, 429

(56) References Cited

U.S. PATENT DOCUMENTS

| | | | | |
|---|---|---|---|---|
| 4,786,964 A | * | 11/1988 | Plummer et al. ............ | 348/270 |
| 5,295,204 A | * | 3/1994 | Parulski .................... | 348/223.1 |
| 5,548,333 A | * | 8/1996 | Shibazaki et al. .......... | 348/270 |
| 6,014,234 A | * | 1/2000 | Yamamoto .................. | 358/522 |
| 2002/0155589 A1 | * | 10/2002 | Tsuchiya ................. | 435/287.2 |

* cited by examiner

Primary Examiner—Ngoc-Yen Vu
(74) Attorney, Agent, or Firm—Sughrue Mion, PLLC

(57) ABSTRACT

The inserted or removed state of an exciting-light cut filter, the diaphragmed state of a variable diaphragm, a tray rail holding a tray thereon, and the state of illuminating light, set in a photographing apparatus by an operator, are detected by a filter detection sensor, a diaphragm detection sensor, a tray detection sensor, and an illuminating-light switch unit, respectively. These results of detection are input to an image processing condition determination unit of a personal computer.

16 Claims, 2 Drawing Sheets

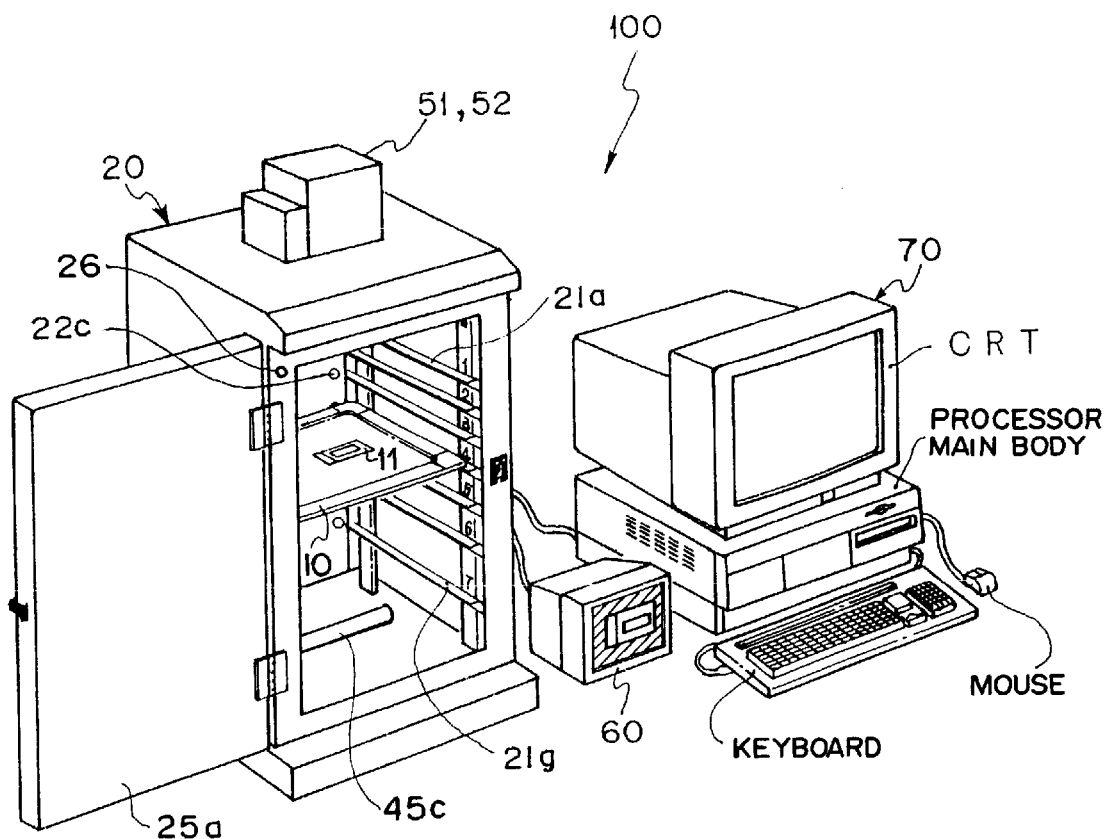
F I G. 2

PHOTOGRAPHING SYSTEM

BACKGROUND OF THE INVENTION

1. Field of the Invention

The present invention relates generally to a photographing system, and more particularly to an improvement in a photographing system in which a plurality of photographing methods are prepared according to a difference in a photographing object.

2. Description of the Related Art

In the field of biological chemistry and molecular biology, a fluorescence detecting system using a fluorescent dye as a labeling material is hitherto known. According to this system, the evaluations or the like of the arrangement of a gene, the expression level of a gene, the path and state of the metabolism, absorption, and excretion of an applied material in a laboratory mouse, and the separation, identification, molecular weight, and characteristics of protein can be performed, by reading out image information related to a sample distributing specific organism-originated materials labeled with a fluorescent dye.

For example, by utilizing the electrophoresis that causes a living cell in suspension or a biological compound (protein, etc.) in a solution to move to a positive or negative electrode through an electric field by the electric charge, a plurality of deoxyribonucleic acid (DNA) fragments are electrophoresed on a gel support body, after a fluorescent dye has been added into a solution containing the plurality to of DNA fragments. Alternatively, a plurality of DNA fragments are electrophoresed on a gel support body contained with a fluorescent dye, or, after a plurality of DNA fragments have been electrophoresed on a gel support body, this gel support body is immersed into a solution containing a fluorescent dye. In this way, a gel support body (sample) distributing specific DNA fragments (organism-originated materials) labeled with fluorescence is obtained. Within a black box shielded from external light, the obtained gel support body placed on a suitable sample tray is irradiated with excitation light for exciting the fluorescent dye employed as a labeling material. The fluorescence emitted from the gel support body is photoelectrically read out. In this way, image information representing a distribution of DNA fragments labeled with fluorescence is acquired, and based on the acquired image information, a visual image is displayed on a display section such as a CRT display, whereby the evaluation of the molecular weight of the DNA fragment and the like can be performed.

On the other hand, in the same field, a chemiluminescence method of photographing an image of chemiluminescence by employing photoelectric reading means such as a charged-coupled device (CCD) is known as a method of detecting a nucleic acid and protein in a membrane filter or the like after blotching. As an apparatus for photographing such an image of chemiluminescence, a photographing apparatus is known in which, as with the aforementioned fluorescence detecting apparatus, a membrane filter or the like is placed on a suitable sample tray and housed within a block box shielded from external light. Within this black box, chemiluminescence emitted from the membrane filter or the like is photoelectrically read out by photoelectric reading means through a lens, and in this way, image information representing a distribution of specific protein or the like reacting to a predetermined luminescent chemical material is acquired.

Here, the aforementioned photographing apparatus with the object of detecting chemiluminescence can also be used as a photographing apparatus for the aforementioned fluorescence detecting system, by further providing an exciting-light source which emits exciting light capable of exciting a fluorescent dye and an exciting-light cut filter for transmitting only fluorescence to the photoelectric reading means and preventing passage of exciting light. Therefore, a photographing apparatus adding the function of detecting fluorescence to the photographing apparatus for chemiluminescence detection has been developed.

That is, in the case of performing photographing for chemiluminescence detection, exciting light is prevented from being emitted. Also, the exciting-light cut filter is removed from the optical path of chemiluminescence, and chemiluminescence emitted from a sample is detected by the photoelectric reading means. On the other hand, in the case of performing photographing for fluorescence detection, a sample is illuminated with exciting light, the exciting-light cut filter is disposed in the optical path of fluorescent emitted from the sample, and the light source and the exciting-light cut filter are switched separately or integrally such that fluorescence alone is detected by the photoelectric reading means. Furthermore, in the case where there is a great difference in intensity between fluorescence and chemiluminescence, the quantity of light to be incident on the photoelectric reading means is adjusted by providing a variable diaphragm.

Furthermore, the aforementioned photographing apparatus can also be used as a digitizer, in which a translucent manuscript (film, etc.) or a reflecting manuscript (a photograph, etc.) is irradiated and the transmitted image or the reflected image is photoelectrically read out by photoelectric reading means through a lens, thereby obtaining a digital image. In this case, the light to be emitted from the exciting light source employs white light, not the exciting light in a band that can excite fluorescence. In this way, the quantity of light to be incident on the photoelectric reading means is limited.

Also, in the photographing apparatus thus rendering switching of photographing methods possible in accordance with a photographing object, an apparatus capable of photographing an image appropriate to the size of a sample by varying a viewing angle of view that is incident on photoelectric reading means through a lens is known. More specifically, a plurality of disposing sections each having a different distance from the lens are formed as sample-tray disposing sections on which a sample tray is disposed. A sample tray can be disposed selectively on one sample-tray disposing section of the plurality of sample-tray disposing sections. The lens is moved in the optical axis direction in accordance with the selected sample-tray disposing section, whereby focusing on the light-receiving surface of the photoelectric reading means is rendered possible.

Incidentally, it is common practice for the image signal acquired by the aforementioned photographing apparatus to be given various kinds of image processing by an image processing computer (including a personal computer (PC)) and is employed in quantitative analysis or the like. Usually, the photographing apparatus and the image processing computer constitute a photographing system.

As an example of the image processing to be performed by the image processing computer, there are various kinds of correction processing. For instance, the shading correction of correcting peripheral extinction due to the lens of the photographing apparatus corresponds to this correction processing. In this shading correction processing, the processing condition varies according to the aforementioned photographing method including selection of the sample-tray disposing section.

More specifically, when the photographing method detects chemiluminescence, the processing condition is, for example, that lens brightness data is previously obtained according to a distance from the center of the lens, this data is stored as one-dimensional profile data, and for an image signal obtained by photographing, shading correction is made based on the one-dimensional profile data. In the method of detecting fluorescence, the processing condition is, for example, that a reference sample distributing a fluorescent dye evenly is irradiated with exciting light through an exciting-light cut filter and a diaphragm of 0.85 at each position of the sample-tray disposing sections, the obtained image signal is stored as flat frame data, and based on this flat frame data, shading correction is carried out. In the digitizing method of detecting the reflected or transmitted light of the illuminating light, the processing condition is, for example, that a reference sample with an even density is irradiated with the illuminating light without an exciting-light cut filter and with a diaphragm of 2.8 at each position of the sample-tray disposing sections, the obtained image signal is stored as flat frame data, and based on this flat frame data, shading correction is carried out. In addition, in the digitizing method, flat frame data are obtained in the cases of detecting the transmitted light and reflected light, respectively and shading correction is carried out based on the corresponding flat frame data.

Note that there are cases where in other image processing such as gradation processing, the processing condition is also changed from photographing method to photographing method.

Here, in the conventional photographing system, the photographing method set in the photographing apparatus by the operator, that is, the disposition of a sample onto a suitably selected sample-tray disposing section and the contents of the operation of switching the exciting-light cut filter and the diaphragm in accordance with a photographing object are manually input to the image processing computer by the operator. With this manual input, the image processing after photographing is appropriately performed.

However, there are cases where the operator inputs erroneous contents when the photographing method set in the photographing apparatus is input to the image processing computer. In such a case, an appropriate result of image processing cannot be obtained and therefore there is a possibility that erroneous judgement will be incurred in the quantitative image analysis or the like.

In addition, inputting the contents of the photographing method set in the photographing apparatus one by one to the image processing computer is troublesome, so improvements are desired.

SUMMARY OF THE INVENTION

The present invention has been made in view of the aforementioned circumstances. Accordingly, it is an object of the present invention to provide a photographing system that simplifies a switch of image processing to be made by an image processing computer in accordance with a photographing method set in a photographing apparatus by an operator.

The photographing system of the present invention transmits a photographing method set in the photographing apparatus by an operation, that is, the inserted or removed state of an exciting-light cut filter, the diaphragmed state of a variable diaphragm, and a sample-tray disposing section having a sample tray thereon to an image processing computer, thereby automatically determining a condition for image processing to be performed by the image processing computer.

That is, the photographing system of the present invention comprises a photographing apparatus including: (1) a lens movable in an optical axis direction; (2) a plurality of sample-tray disposing sections on which a sample tray placing a predetermined sample thereon is selectively disposed, the sample-tray disposing sections each having a different distance from the lens in the optical axis direction; (3) sample-tray disposing section detection means for detecting one sample-tray disposing section of the plurality of sample-tray disposing sections on which the sample tray was disposed; (4) a light source provided so that it can switch emission and non-emission of exciting light or illuminating light with respect to the predetermined sample on the sample tray disposed on the detected sample-tray disposing section; (5) photoelectric reading means for photoelectrically reading out an image of the predetermined sample, formed on its light-receiving surface by the lens (6) lens movement means for moving the lens in the optical axis direction in accordance with the one sample-tray disposing section detected by the sample-tray disposing section detection means such that the image of the predetermined sample is formed onto the light-receiving surface of the photoelectric reading means; (7) an exciting-light cut filter provided between the lens and the photoelectric reading means so that it can be inserted in or removed from an optical path of light constituting the image of the predetermined sample, the filter having bands set so as to transmit florescence emitted from the predetermined sample and prevent passage of the exciting light; (8) a variable diaphragm provided between the lens and the photoelectric reading means and in proximity to the lens; and (9) a black box shield from light, the components (1) to (8) being housed inside the black box; and an image processing computer for performing predetermined image processing with respect to an image signal representing the image of the predetermined sample read out by the photoelectric reading means. The photographing system further comprises: filter detection means for detecting an inserted or removed state of the exciting-light cut filter; diaphragm detection means for detecting a diaphragmed state of the variable diaphragm; and image processing condition determination means for determining a condition for the predetermined image processing to be performed by the image processing computer with respect to the image signal read out by the photoelectric reading means, in accordance with the inserted or removed state of the filter detected by the filter detection means, the diaphragmed state of the variable diaphragm detected by the diaphragm detection means; and the one sample-tray disposing section detected by the sample-tray disposing section detection means.

The aforementioned light source is capable of selectively emitting exciting light and illuminating light and being switched to three emission and non-emission modes: exciting light emission and illuminating light non-emission, exciting light non-emission and illuminating light emission, and exciting light non-emission and illuminating light non-emission. Note that an exciting light source for emitting only exciting light and an illuminating light source for emitting only illuminating light may be provided separately.

It is preferable that the aforementioned photoelectric reading means employ an interline type CCD equipped with a cooling element, capable of having a wide dynamic range which can detect feeble chemiluminescence and fluorescence with good linearity and also taking out a pseudo-dynamic picture by reiteratively performing photoelectric reading in a short time period.

In the case of a sample (fluorescence detecting sample) distributing specific organism-originated materials labeled with a fluorescent dye, the fluorescence that is emitted from the sample is intended to mean fluorescence which the fluorescent dye labeling the organism-originated materials emits when excited with exciting light. In the case of a sample (chemiluminescence detecting sample) distributing organism-originated materials such as protein that reacts to a predetermined luminescent chemical material or the case of a manuscript such as film, and a photograph, for digitization, the sample or the manuscript emits no fluorescence.

In the case of the aforementioned fluorescence detecting sample, the image of the sample, which is formed onto the light-receiving surface of the photoelectric reading means, is intended to mean the distributed images of specific organism-originated materials labeled with a fluorescent dye. In the case of the chemiluminescence detecting sample, the image of the sample is intended to mean the distributed images of organism-originated materials that react to a predetermined luminescent chemical material. In the case of a translucent manuscript such as film, the image of the sample is intended to mean a reflected image of the manuscript, and in the case of a reflecting manuscript such as a photograph, the image of the sample is intended to mean a reflected image thereof. Note that when, in a focus mode to be described later, an image signal is output as a video signal, the image of the sample is intended to mean a reflected image of the sample reflected by external light or light emitted from a light source.

The aforementioned lens movement means is constituted by a focus ring provided in a lens, etc. and a motor for rotating this focus ring and can employ various means known in the prior art.

The aforementioned variable diaphragm may be switched simply between an open state and a diaphragmed state or switched in stages therebetween.

The aforementioned image processing computer does not need to be a dedicated machine for image processing but may be general-purpose personal computers, workstations, etc. having enhanced calculation processing performance. The image processing to be performed by the image processing computer includes, for example, shading correction processing, flat frame correction processing, etc. and includes at least image processing having a difference in a processing condition and a difference in processing contents in accordance with the kind of sample, i.e., the kind of photographing method.

The specific difference in the image processing condition is as follows: When a photographing method detects chemiluminescence, the processing condition is, for example, that lens brightness data is previously obtained according to a distance from the center of the lens, this data is stored as one-dimensional profile data, and for an image signal obtained by photographing, shading correction is carried out based on the one-dimensional profile data. In the method of detecting fluorescence, the processing condition is, for example, that a reference sample distributing a fluorescent dye evenly is irradiated with exciting light through an exciting-light cut filter and a diaphragm of 0.85 at each position of the sample-tray disposing sections, the obtained image signal is stored as flat frame data, and based on this flat frame data, shading correction is carried out. In the digitizing method of detecting the reflected or transmitted light of the illuminating light, the processing condition is, for example, that a reference sample with an even density is irradiated with the illuminating without an exciting-light cut filter and with a diaphragm of 2.8 at each position of the sample-tray disposing sections, the obtained image signal is stored as flat frame data, and based on this flat frame data, shading correction is carried out. These are differences in the processing condition. In addition, in the digitizing method, flat frame data are obtained in the cases of detecting the transmitted light and the reflected light, respectively and shading correction is carried out based on the corresponding flat frame data, so the processing conditions also differ from each other.

The determination of the condition of the image processing to be performed by the image processing computer in accordance with the inserted or removed state of the exciting-light cut filter, the diaphragmed state of the variable diaphragm, and the position of the sample-tray disposing section having the sample tray thereon is performed by the following specific operation.

First, when the exciting-light cut filter is in the optical path, it is confirmed that the photographing object is a sample of detecting fluorescence emitted therefrom by emission of exciting light, because the exciting-light cut filter is used in the fluorescence detecting sample. When, on the other hand, the exciting-light cut filter is removed out of the optical path, it is confirmed that the photographing object is either a chemiluminescence detecting sample or a digitizing sample. Next, in the open state of the variable diaphragm, it is confirmed that the detecting object is fluorescence or chemiluminescence whose intensity is feeble, because the diaphragmed state of the variable diaphragm limits the quantity of light that is incident on the photoelectric reading means. In an appropriately diaphragmed state, it is confirmed that the detecting object is light from a manuscript for digitization.

Thus, a photographing method (kind of detecting object) can be specified by the inserted or removed state of the exciting-light cut filter and the diaphragmed state of the variable diaphragm, and an appropriate condition for image processing, which differs from object to object being detected, can be determined.

Furthermore, using the result of the detection of the sample-tray disposing section having the sample tray placed thereon, a processing condition for shading correction processing, which differs from sample-tray disposing section to sample-tray disposing section, can be determined.

In a preferred form of the present invention, the photographing system further comprises interrelating means for interrelating switching of the emission and non-emission of the exciting light, which is performed by the light source, with the inserted or removed state of the exciting-light cut filter so that the exciting light is emitted when the exciting-light cut filter is in the optical path and is not emitted when the exciting-light cut filter is out of the optical path. The reason for this is that the operational labor of the operator can be further reduced, if switching between the emission and non-emission of the exciting light is interlocked with switching between the inserted state and the removed state of the exciting-light cut filter, because the exciting-light cut filter is used only in the case of a fluorescent detecting sample.

Note that when the exciting-light cut filter is out of the optical path, exciting light is not emitted from the light source. However, when the variable diaphragm is in the diaphragmed state, the sample is a digitizing sample (manuscript). For this reason, interrelating means may further be provided so that the light source emits illuminating light. However, because the digitizing sample includes a translucent manuscript and a reflecting manuscript, a method of illumination differs between these manuscripts. Therefore, in addition to emitting illuminating light in interrelation with the exciting-light cut filter and the variable diaphragm, there is a need to switch the direction of illumination of the illuminating light. This switching depends upon an operation of the operator. In the case where, for an image signal obtained by digitization, a condition for image processing to be performed by the image processing computer differs according to whether the manuscript is a translucent manuscript or a reflecting manuscript, illumination-switching detection means for detecting switching of the illumination direction of the illuminating light may further be provided, and based on the result of detection from the illumination-switching detection means, the image processing condition determination means may determine an image processing condition corresponding to the kind of digitizing manuscript.

In another preferred form of the present invention, the photographing system further comprises door detection means for detecting a closed or open state of a door formed in the black box and a light source controller for switching on the light source independently of the inserted or removed state of the exciting-light cut filter when the open state of the door is detected by the door detection means. When the door of the black box is open, an image is no longer read out but a preparatory operation for reading, such as insertion or removal of the sample tray, or an operation after reading is performed. Therefore, by illuminating the interior of the black box in interrelation with the open state of the door, labor for the operator to switch on and off the light source can be omitted.

In still another preferred form of the present invention, the photographing system further comprises a camera controller for controlling the photoelectric reading means so that photoelectric reading to be performed by the photoelectric reading means is switched to reading, which is performed reiteratively in a shorter time period than reading for the predetermined image processing, for outputting the image signal as a video signal. By displaying the image of the sample, disposed on the sample-tray disposing section within the black box, on a monitor or the like, a dynamic image can be viewed in approximately real time. It is useful in performing fine adjustments to the lens position (focusing adjustments) in accordance with the thickness of a sample. Note that such a mode of outputting an image signal reiteratively in a short time period will hereinafter be referred to as a focus mode. Also, in the photographing system with both the light source controller and the camera controller described above, there is no need to provide the door detection means in each controller separately and a single door detection means will suffice if it can output door detection signals to both controllers, respectively.

According to the photographing system of the present invention, the photographing method set in the photographing apparatus by the operator, that is, the inserted or removed state of the exciting-light cut filter, the diaphragmed state of the variable diaphragm, and the sample-tray disposing section having a tray placed thereon are detected by the filter detection sensor, the diaphragm detection sensor, and the sample-tray disposing section detection means, respectively. Based on these results of detection, the image processing condition determination means of the image processing computer recognizes the photographing method and determines an image processing condition for performing optimal image processing for each of the photographing methods. For this reason, there is no need to input one by one the contents of the photographing method set in the photographing apparatus by the operator to the image processing computer. Thus, erroneous input and labor of input with respect to the image processing computer can be omitted.

BRIEF DESCRIPTION OF THE DRAWINGS

The above and other objects and advantages will become apparent from the following detailed description when read in conjunction with the accompanying drawings wherein:

FIG. 2 is a perspective view illustrating the photographing system illustrated in FIG. 1.

DESCRIPTION OF THE PREFERRED EMBODIMENTS

Figure 1:
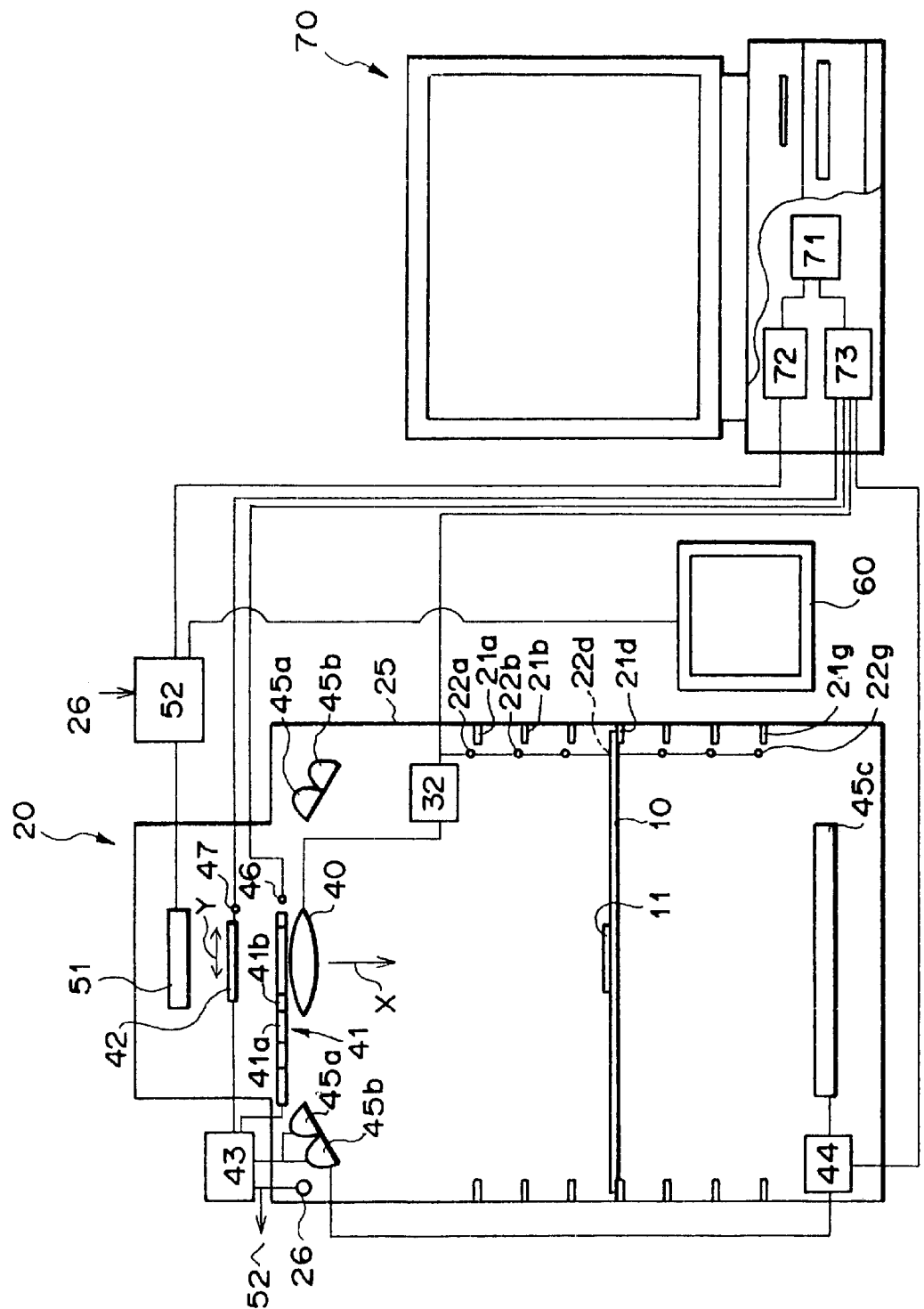
FIG. 1 is a diagram illustrating the overall construction of a preferred embodiment of a photographing system of the present invention.

A preferred embodiment of a photographing system of the present invention will hereinafter be described with reference to the drawings.

FIG. 2 illustrates the construction of the preferred embodiment of the photographing system of the present invention and FIG. 1 illustrates the entire construction including the interior of the photographing system illustrated in FIG. 2. The photographing system 100 comprises a photographing apparatus 20 for performing photographing of a sample, a personal computer (PC) 70 for performing image processing with respect to an image signal photographed by the photographing apparatus 20, and a monitor 60 for displaying the sample disposed within the photographing apparatus 20.

The photographing apparatus 20 includes: (1) a lens 40 movable in the optical axis X direction; (2) 7 tray rails 21a, 21b, . . . 21g on which a tray 10 having a predetermined sample 11 placed thereon is selectively disposed, the tray rails each having a different distance from the lens 40 in the optical axis X direction; (3) tray rail detection sensors 22a, 22b, . . . 22g for detecting one tray rail of these 7 tray rails on which the tray 10 has actually been disposed; (4) an interline type charged-coupled device (CCD) 51, provided with a cooling element, for photoelectrically reading out the image of the sample 11 formed on its light-receiving surface by-the lens 40; (5) lens movement means 32 for moving the lens 40 in the optical axis X direction such that the image of the sample 11 is formed on the light-receiving surface of the CCD 51, in accordance with the rail (e.g., 21d in the illustrated embodiment) actually having the tray 10 placed thereon, detected by one of the tray rail detection sensors 22a, 22b, . . . 22g; (6) an exciting-light cut filter 42 provided between the lens 40 and the CCD 51 so that it can be inserted in or removed from an optical path of light constituting the image of the sample 11, the filter 42 having bands set so as to transmit florescence emitted from the sample 11 and prevent transmission of blue LED light exciting the florescence, when the sample 11 is a florescence detecting sample; (7) a filter detection sensor 47 for detecting whether the exciting-light cut filter 42 has been inserted in or removed from the aforementioned optical path; (8) a variable diaphragm 41 provided between the lens 40 and the exciting-light cut filter 42 and in proximity to the lens 40, the variable diaphragm 41 consisting of a small-diameter aperture 41a in a diaphragmed state and a large-diameter aperture 41*b* in an open state; (9) a diaphragm detection sensor 46 for detecting whether either of the two apertures 41*a* and 41*b* has been disposed in the aforementioned optical path; (10) a light source consisting of a white LED light source 45*a* for emitting white LED light, a blue LED light source 45*b* for emitting blue LED light, and a fluorescent lamp 45*c* for emitting white light from under the sample 11; (11) interrelating means 43 for switching the white LED light and the blue LED light emitted from the white and blue LED light sources 45*a*, 45*b* in interrelation with both the inserted or removed state of the exciting-light cut filter 42 relative to the aforementioned optical path and the state of the variable diaphragm 41; (12) illuminating-light switch means 44 for switching the white LED light emitted from the white LED light source 45*a* and the white light emitted from the fluorescent lamp 45*c*; (13) a door detection sensor 26 for detecting the open or closed state of the door 25*a* of a black box 25 that is the main body case of the photographing apparatus 20; and (14) a camera controller 52 for performing control of switching the read mode of the CCD 51 to either a focus mode or a photograph mode.

Here, the photograph mode of the CCD 51 that is controlled by the camera controller 52 is the read mode for transmitting an image signal, which is the image of the sample 11, to the PC 70 and for performing image processing or the like with respect to the transmitted image signal and then performing analysis processing such as a weighing process, this mode being a mode for performing a read operation in a relatively longer exposure time. On the other hand, the focus mode is the read mode for performing a reiterative read operation in a shorter time period compared with the photograph mode and transmitting an image signal, which is each result of the read operations, to the monitor 60 as a video signal, this mode being a mode that is employed when focusing is performed by the lens movement means 32. If the door detection sensor 26 detects the open state of the door 25*a*, the read mode of the CCD 51 is switched to the focus mode. If, on the other hand, the door detection sensor 26 detects the closed state of the door 25*a*, the read mode of the CCD 51 is switched to the photograph mode.

The tray rail detection sensors 22*a*, 22*b*, . . . 22*g* correspond to the tray rails 21*a*, 21*b*, . . . 21*g*, respectively.

The exciting-light cut filter 42 and the variable diaphragm 41 are individually movable in the direction of arrow Y by hand. The interrelating means 43 interrelates the exciting-light cut filter 42 and the variable diaphragm 41 with each of the white and blue LED light sources 45*a*, 45*b* such that (1) blue LED light is emitted from the blue LED light source 45*b* when the filter 42 is in the optical path, (2) both the white LED light source 45*a* and the blue LED light source 45*b* are switched off when the filter 42 is out of the optical path and also when the large-diameter aperture 41*b* of the variable diaphragm 41 is in the optical path, and (3) illuminating light (white LED light) is emitted from the white LED light source 45*a* when the filter 42 is out of the optical path and also when the small-diameter aperture 41*a* of the variable diaphragm 41 is in the optical path. During the time that the door detection sensor 46 detects the open state of the door 25*a*, the interrelating means 43 switches on the white LED light source 45*a* independently of the aforementioned states of the filter 42 and the variable diaphragm 41.

The illuminating-light switch means 44 manually switches to (1) switch on the white LED light source 45*a* and switch off the fluorescent lamp 45*c* or (2) switch off the white LED light source 45*a* and switch on the fluorescent lamp 45*c*. That is, the illuminating-light switch means 44 switches on the white LED light source 45*a* when the sample 11 is a reflecting manuscript and switches on the florescent lamp 45*c* when the sample 11 is a transmitting manuscript. Note that this switched state is input to the image-processing-condition determination means 73 of the PC 70 to be described later.

The results of detection of the tray rail detection sensors 22*a*, 22*b*, . . . 22*g*, the filter detection sensor 47, and the diaphragm detection sensor 46 are also input to the image-processing-condition determination means 73.

When the CCD 51 is switched to the focus mode by the aforementioned camera control 52, the monitor 60 receives a video signal being reiteratively transmitted in a shorter time period compared with the photograph mode through the camera control 52 from the CCD 51 and displays a visual image based on this video signal. At this time, the image signal input to the monitor 60 is displayed as a pseudo-dynamic picture on the monitor 60, because it is a video signal reiteratively transmitted in a shorter time period. Therefore, when the image-formed state of the image of the sample 11 on the light-receiving surface of the CCD 51 is out of focus because of the thickness of the sample 11 placed on the tray 10, focusing can be performed by moving the lens 40 with the lens movement means 32, while viewing an image displayed on the monitor 60.

The PC 70 comprises a main body, a CRT display, a keyboard, and a mouse. The main body includes: (1) memory 72 for storing an image signal input in the photograph mode from the CCD 51 through the camera controller 52; (2) image processing means 71 for performing image processing (e.g., shading correction processing) according to a predetermined image processing condition with respect to an image signal stored in the memory 72; and (3) image-processing-condition determination means 73 to which both the switched state of the white LED light source 45*a* or fluorescent lamp 45*c* from the illuminating-light switch means 44 and the results of detection of the tray rail detection sensors 22*a*, 22*b*, . . . , 22*g*, filter detection sensor 47, and diaphragm detection sensor 46 are input, the determination means 73 determining a condition for image processing to be performed by the image processing means 71 on the basis of the input switched state and detection results.

Now, the operation of the photographing system 100 of the preferred embodiment will hereinafter be described.

The operator first places a sample 11 for chemiluminescence detection (e.g., a membrane filter on which materials presenting chemiluminescence are distributed) at a predetermined position on the tray 10. Then, the operator selects a tray rail (e.g., tray rail 21*d*) corresponding to photographing at a desired angle of view and disposes the tray 10 on the tray rail 21*d*.

At first, the lens 40 has been stopped at a predetermined initial position. With the placement of the tray 10 by the operator, the sensor 22*d* corresponding to the rail 21*d* of the fourth row on which the tray 10 was placed, among the sensors 22*a* to 22*g* disposed within the black box 20, detects that the sample tray 10 has been placed and sends this detection signal to the lens movement means 32. At this time, there is no possibility that the other sensors 22*a* to 22*c* and 22*e* to 22*g* will output detection signals, because the tray 10 is not present in the corresponding rails 21*a* to 21*c* and 21*e* to 21*g*.

In response to the detection signal, the lens movement means 32 recognizes that the detection signal was output from the sensor 22*d* and moves the lens 40 in the optical axis direction to a position suitable for forming the image of the sample 11 on the tray 10 disposed on the rail 21*d* of the fourth row corresponding to the sensor 22d onto the light-receiving surface of the CCD 51. The detection signal from the sensor 22d is also input to the image-processing-condition determination means 73 of the PC 70.

Because the sample 11, which is a photographing object, is a sample for chemiluminescence detection, the operator manually operates the variable diaphragm 41 such that the large-diameter aperture 41b of the variable diaphragm 41 is disposed in the optical path between the lens 40 and the CCD 51, and furthermore, manually removes the exciting-light cut filter 42 from the optical axis. With this operation, the interrelating means 43 switches off both the white LED light source 45a and the blue LED light source 45b. However, since the door 25a has been opened, the door detection sensor 26 has detected the open state of the door 25a and input it to the interrelating means 43, so that the interrelating means 43 has switched on the white LED light source 45a. In this way, the black box 25 is illuminated with the white LED light emitted from the white LED light source 45a, so the operator can perform operation under the illuminating light and operability is good.

The filter detection sensor 47 detects that the operator removed the exciting-light cut filter 42 from the optical path. The result of detection is input to the image-processing-condition determination means 73. Furthermore, the diaphragm detection sensor 46 detects that the operator disposed the large-diameter aperture 41b of the variable diaphragm 41 in the optical path. This result of detection is also input to the image-processing-condition determination means 73.

Note that since the operator does not switch the illuminating-light switch means 44 to the fluorescent lamp 45c, the illumination of the black box 25 is performed by the white LED light source 45a, as described above. The result of detection indicating that the operator does not perform this switching is also input to the image-processing-condition determination means 73.

On the other hand, the detection result from the door detection sensor 26 detecting the open state of the door 25a has also been input to the camera controller 52. In response to this result, the camera controller 52 has switched the read mode of the CCD 51 to the focus mode. The image signal output from the CCD 51 is output to the monitor 60 through the camera controller 52. The monitor 60 displays a visual image corresponding to the input image signal.

Note that the image signal output from the CCD 51 is the image of the sample 11 formed on the light-receiving surface of the CCD 51 by the lens 40. However, there are cases where, depending upon the thickness of the sample 11, the image on the light-receiving surface of the CCD 51 is out of focus at the previously set lens position of the lens 40 moved by the lens movement means 32. Hence, the operator directly operates the lens movement means 32, viewing the monitor 60. With this, the lens position can be finely adjusted such that the image of the sample 11 on the light-receiving surface of the CCD 51 is in focus. When this focusing adjustment is performed, a clear image can also be viewed, because the sample 11 is illuminated with the illuminating light emitted from the white LED light source 45a.

If the foregoing preparation operation ends, the operator closes the door 25a of the black box 25, thereby shielding light from the black box 25.

Here, if the door 25a of the black box 25 is closed, the door detection sensor 26 detects the closed state of the door 25a and outputs this result of detection to the interrelating means 43 and the camera controller 52.

In response to the input result, the interrelating means 43 switches off the white LED light source 45a. In this way, the light within the black box 25 is only the chemiluminescence from the sample 11.

On the other hand, the camera controller 52 receiving the detection result from the door detection sensor 26 switches the read mode of the CCD 51 from the focus mode to the photograph mode. However, the camera controller 52 always monitors the cooled temperature of the CCD 51, thereby controlling the CCD 51 so that the CCD 51 does not start exposure until it stabilizes at a constant temperature. Here, after the CCD 51 has stabilized at a constant temperature, it may start exposure automatically. Alternatively, the CCD 51 may be controlled so that it does not start exposure until instructions to start exposure are input from the camera controller 52 or the PC 70.

Here, the distributed images of the chemiluminescence emitted from the sample 11 have been formed on the light-receiving surface of the CCD 51 through the large-diameter aperture 41b of the variable diaphragm 41 by the lens 40. The CCD 51 starts exposure and performs exposure by a predetermined exposure time period (e.g. 30 min, etc.) and reads out the distributed images photoelectrically. The read image signal is stored in the memory 72 of the PC 70 through the camera controller 52.

As described above, the detection signal from the sensor 22d representing the disposed position of the tray 10, the detection result from the filter detection sensor 47, the detection result from the diaphragm detection sensor 46, and the detection result from the illuminating-light switch means 44 have been input to the image-processing-condition determination means 73 of the PC 70. Based on these results, the image-processing-condition determination means 73 determines a condition for image processing that is performed by the image processing means 71.

More specifically, based on the detection result indicating that the exciting-light cut filter 42 has been removed from the optical path and the detection result indicating that the large-diameter aperture 41b of the variable diaphragm 41 has been disposed in the optical path, the image-processing-condition determination means 73 recognizes that the sample 11 is a sample for chemiluminescence detection, thereby determining an image processing condition such that the image processing by the image processing means 71 is image processing suitable for analyzing the distributed images of chemiluminescence.

The image processing condition determined here is a processing condition that shading correction is performed based on lens brightness data (one-dimensional profile data) corresponding to a previously obtained distance from the center of the lens 40. Note that although, for chemiluminescence, shading correction is performed based on one-dimensional data independently of the position of the trail rail on which the tray 10 is disposed, the present invention is not limited to this.

The image processing condition determined in the aforementioned manner is input to the image processing means 71, which in turn reads out an image signal stored in the memory 72 and processes this image signal in accordance with the image processing condition determined by the image-processing-condition determination means 73. The processed image signal is displayed, for example, on a CRT display, or is output for the subsequent processing such as quantitative analysis. Or it is stored and archived in a storage medium such as a hard disk.

If photographing ends, the operator opens the door 25a to replace the tested sample with the next sample. The open state of the door 25a is detected by the door detection sensor 26. As with the aforementioned preparatory operation, the interrelating means 43 switches on the white LED light source 45a and the camera controller 52 switches the read mode of the CCD 51 to the focus mode. In this open state, the CCD 51 photoelectrically reads out the image signal, which is in turn displayed on the monitor 60.

Next, the operator places a sample 11 for fluorescence detection (e.g., gel distributing specific DNA fragments labeled with a fluorescent dye) at a predetermined position on the tray 10. Then, the operator selects a tray rail (e.g., tray rail 21c) corresponding to photographing at a desired angle of view and disposes the tray 10 on the tray rail 21c. With the placement of the tray 10 by the operator, the sensor 22c detects that the sample tray 10 has been placed and sends this detection signal to the lens movement means 32.

In response to the detection signal, the lens movement means 32 recognizes that the detection signal was output from the sensor 22c and moves the lens 40 in the optical axis direction to a position suitable for forming the image of the sample 11 on the tray 10 disposed on the rail 21c of the third row corresponding to the sensor 22c onto the light-receiving surface of the CCD 51. The detection signal from the sensor 22c is also input to the image-processing-condition determination means 73 of the PC 70.

Because the sample 11, which is a photographing object, is a sample for fluorescence detection, the operator manually operates the variable diaphragm 41 such that the large-diameter aperture 41b of the variable diaphragm 41 is disposed in the optical path between the lens 40 and the CCD 51, and furthermore, manually disposes the exciting-light cut filter 42 in the optical path. With this operation, the interrelating means 43 switches on the blue LED light source 45b, which in turn emits blue LED light. However, since the door 25a has been opened, the interrelating means 43 also switches on the white LED light source 45a, the same as the aforementioned operation. In this way, the black box 25 is illuminated with the white LED light emitted from the white LED light source 45a, so the operator can perform operation under the illuminating light.

The filter detection sensor 47 detects that the exciting-light cut filter 42 was disposed in the optical path. The result of detection from the filter detection sensor 47 is input to the image-processing-condition determination means 73. Furthermore, the diaphragm detection sensor 46 detects that the large-diameter aperture 41b of the variable diaphragm 41 was disposed in the optical path. This result of detection is also input to the image-processing-condition determination means 73.

On the other hand, in response to the detection result from the door detection sensor 26 detecting the open state of the door 25a, the camera controller 52 switches the read mode of the CCD 51 to the focus mode and causes the monitor 60 to display a visual image. Note that when focusing is needed, the same operation as the aforementioned is performed.

If the foregoing preparation operation ends, the operator closes the door 25a of the black box 25, thereby shielding light from the black box 25. In this way, the white LED light source 45a is switched off. Within the black box 25, the sample 11 is irradiated with the blue LED light emitted from the blue LED light source 45b. The fluorescent dye labeling the distributed DNA fragments is excited and emits light from the sample 11 irradiated with the blue LED light, whereby a distribution of fluorescence corresponding to the distributed DNA fragments is emitted.

On the other hand, the camera controller 52 receiving the detection result from the door detection sensor 26 switches the read mode of the CCD 51 from the focus mode to the photograph mode. At this time, exposure is not started until the cooled temperature of the CCD 51 stabilizes at a constant temperature, as described above.

On the light-receiving surface of the CCD 51, the distributed images of the fluorescence emitted from the sample 11 have been formed through the large-diameter aperture 41b of the variable diaphragm 41 and the exciting-light cut filter 42 by the lens 40. The CCD 51 starts exposure and performs exposure for a predetermined exposure time period and reads out the distributed images photoelectrically. The read image signal is stored in the memory 72 of the PC 70 through the camera controller 52. At this time, reflected light, which is part of the blue LED light emitted to the sample 11, is also incident on the lens 40, but this blue LED light is cut by the exciting-light cut filter 42 and is not incident on the CCD 51.

As described above, the detection signal from the sensor 22c representing the disposed position of the tray 10, the detection result from the filter detection sensor 47, the detection result from the diaphragm detection sensor 46, and the detection result from the illuminating-light switch means 44 have been input to the image-processing-condition determination means 73 of the PC 70. Based on these results, the image-processing-condition determination means 73 determines a condition for image processing to be performed by the image processing means 71.

More specifically, based on the detection result indicating that the exciting-light cut filter 42 has been disposed in the optical path, the image-processing-condition determination means 73 recognizes that the sample 11 is a sample for fluorescence detection, thereby determining an image processing condition such that the image processing by the image processing means 71 is image processing suitable for analyzing the distributed images of fluorescence. Furthermore, based on the detection result indicating that the tray 10 has been disposed on the tray rail 21c of the third row, the image-processing-condition determination means 73 determines an image processing condition, such as shading correction processing or flat frame correction processing.

The image processing condition determined here is a processing condition that shading correction is performed based on the flat frame data obtained by irradiating a reference sample, which distributes a fluorescent dye evenly, with exciting light through the exciting-light cut filter and a diaphragm of 0.85 for each of the positions of the sample-tray disposing sections.

The image processing condition determined in the aforementioned manner is input to the image processing means 71, which in turn reads out an image signal stored in the memory 72 and processes this image signal in accordance with the image processing condition determined by the image-processing-condition determination means 73. The processed image signal is displayed, for example, on a CRT display, or is output for the subsequent processing such as quantitative analysis. Alternatively, it may be stored and archived in a storage medium such as a hard disk.

If photographing ends, the operator opens the door 25a to replace the tested sample with the next sample. The open state of the door 25a is detected by the door detection sensor 26. As with the aforementioned preparatory operation, the interrelating means 43 switches on the white LED light source 45a and the camera controller 52 switches the read mode of the CCD 51 to the focus mode. In this open state, the CCD 51 photoelectrically reads out the image signal, which is in turn displayed on the monitor 60.

Next, the operator places a sample 11 for digitization (e.g., positive film) at a predetermined position on the tray 10. Then, the operator selects a tray rail (e.g., tray rail 21b) corresponding to photographing at a desired angle of view and disposes the tray 10 on the tray rail 21b. Here, the tray 10 used is optically transparent, unlike the aforementioned tray. With the placement of the tray 10 by the operator, the sensor 22b detects that the sample tray 10 has been placed and sends this detection signal to the lens movement means 32.

In response to the detection signal, the lens movement means 32 recognizes that the detection signal was output from the sensor 22b and moves the lens 40 in the optical axis direction to a position suitable for forming the image of the sample 11 on the tray 10 disposed on the rail 21b of the second row corresponding to the sensor 22b onto the light-receiving surface of the CCD 51. The detection signal from the sensor 22b is also input to the image-processing-condition determination means 73 of the PC 70.

Because the sample 11, which is a photographing object, is a transparent manuscript for digitization, the operator manually operates the variable diaphragm 41 such that the small-diameter aperture 41a is disposed in the optical path between the lens 40 and the CCD 51, and furthermore, manually removes the exciting-light cut filter 42 from the optical axis. With this operation, the interrelating means 43 switches on the white LED light source 45a, which in turn emits white LED light. Because the sample 11 is a transparent manuscript, the operator further operates the illuminating-light switch means 44 so that the fluorescent lamp 45c disposed on the bottom of the black box 25 is switched on and so that the white LED light source 45a is switched off. The detection result indicating that the operator has switched the illuminating-light switch means 44 to the fluorescent lamp 45c is input from the illuminating-light switch means 44 to the image-processing-condition determination means 73.

The filter detection sensor 47 detects that the exciting-light cut filter 42 was removed from the optical path. The result of detection from the filter detection sensor 47 is input to the image-processing-condition determination means 73. Furthermore, the diaphragm detection sensor 46 detects that the small-diameter aperture 41a of the variable diaphragm 41 was disposed in the optical path. This result of detection is also input to the image-processing-condition determination means 73.

On the other hand, in response to the detection result from the door detection sensor 26 detecting the open state of the door 25a, the camera controller 52 switches the read mode of the CCD 51 to the focus mode and causes the monitor 60 to display a visual image. Note that when focusing is needed, the same operation as the aforementioned is performed.

If the foregoing preparation operation ends, the operator closes the door 25a of the black box 25, thereby shielding light from the black box 25. In this way, within the black box 25, the transparent manuscript (sample 11) is irradiated with the white illuminating light emitted upward from the fluorescent lamp 45c through the transparent tray 10. On the other hand, the camera controller 52 receiving the detection result from the door detection sensor 26 switches the read mode of the CCD 51 from the focus mode to the photograph mode. At this time, exposure is not started until the cooled temperature of the CCD 51 stabilizes at a constant temperature, as described above.

The transmitted light carrying the transmitted image corresponding to the image recorded on the translucent manuscript (sample 11) is emitted from the sample 11 illuminated with the fluorescent lamp 45c. This transmitted light is formed onto the light-receiving surface of the CCD 51 through the small-diameter aperture 41a of the variable diaphragm 41 by the lens 40. The CCD 51 starts exposure and performs exposure for a predetermined exposure time period and reads out the transmitted image photoelectrically. The read image signal is stored in the memory 72 of the PC 70 through the camera controller 52.

As described above, the detection signal from the sensor 22b representing the disposed position of the tray 10, the detection result from the filter detection sensor 47, the detection result from the diaphragm detection sensor 46, and the detection result from the illuminating-light switch means 44 have been input to the image-processing-condition determination means 73 of the PC 70. Based on these results, the image-processing-condition determination means 73 determines a condition for image processing to be performed by the image processing means 71.

More specifically, based on the detection result indicating that the exciting-light cut filter 42 has been removed from the optical path and the detection result indicating that the small-diameter aperture 41a of the diaphragm 41 has been disposed in the optical path, the image-processing-condition determination means 73 recognizes that the sample 11 is a sample for digitization. Furthermore, based on the detection result from the illuminating-light switch means 44, i.e., the result indicating that the sample 11 has been illuminated with the lower fluorescent lamp 45c, the image-processing-condition determination means 73 recognizes that the sample 11 is a translucent manuscript.

As a result, the image-processing-condition determination means 73 determines an image processing condition such that the image processing by the image processing means 71 is image processing suitable for digitizing a translucent manuscript. Furthermore, based on the detection result indicating that the tray 10 has been disposed on the tray rail 21b of the second row, the image-processing-condition determination means 73 determines an image processing condition, such as shading correction processing or flat frame correction processing.

The image processing condition determined here is a processing condition that shading correction is performed based on the flat frame data obtained by illuminating a reference sample, which has an even density, with the illuminating light of the fluorescent lamp 45c without an exciting-light cut filter and with a diaphragm of 2.8 for each of the positions of the sample-tray disposing sections.

The image processing condition determined in the aforementioned manner is input to the image processing means 71, which in turn reads out an image signal stored in the memory 72 and processes this image signal in accordance with the image processing condition determined by the image-processing-condition determination means 73. The processed image signal is displayed, for example, on a CRT display, or is output for the subsequent processing such as quantitative analysis. Alternatively, it may be stored and archived in a storage medium such as a hard disk.

If photographing ends, the operator opens the door 25a to replace the tested sample with the next photographing sample. The open state of the door 25a is detected by the door detection sensor 26. As with the aforementioned preparatory operation, the camera controller 52 switches the read mode of the CCD 51 to the focus mode. In this open state, the CCD 51 photoelectrically reads out the image signal, which is in turn displayed on the monitor 60.

Next, the operator places a sample 11 for digitization (e.g., positive film) at a predetermined position on the tray 10. Then, the operator selects a tray rail (e.g., tray rail 21a) corresponding to photographing at a desired angle of view and disposes the tray 10 on the tray rail 21a. Here, the tray 10 does need to be an optically transparent one. With the placement of the tray 10 by the operator, the sensor 22a detects that the sample tray 10 has been placed and sends this detection signal to the lens movement means 32.

In response to the detection signal, the lens movement means 32 recognizes that the detection signal was output from the sensor 22a and moves the lens 40 in the optical axis direction to a position suitable for forming the image of the sample 11 on the tray 10 disposed on the rail 21a of the first row corresponding to the sensor 22a onto the light-receiving surface of the CCD 51. The detection signal from the sensor 22a is also input to the image-processing-condition determination means 73 of the PC 70.

Because the sample 11, which is a photographing object, is a reflecting manuscript for digitization, the operator manually operates the variable diaphragm 41 such that the small-diameter aperture 41a is disposed in the optical path between the lens 40 and the CCD 51, and furthermore, manually removes the exciting-light cut filter 42 from the optical axis. With this operation, the interrelating means 43 switches on the white LED light source 45a, which in turn emits white LED light. Here, the operator does not switch the illuminating-light switch means 44 to the fluorescent lamp 45c. The detection result indicating that the operator does not switch the illuminating-light switch means 44 to the fluorescent lamp 45c is input from the illuminating-light switch means 44 to the image-processing-condition determination means 73.

In addition, the detection results from the filter detection sensor 47 and the diaphragm detection sensor 46 are input to the image-processing-condition determination means 73.

On the other hand, in response to the detection result from the door detection sensor 26 detecting the open state of the door 25a, the camera controller 52 switches the read mode of the CCD 51 to the focus mode and causes the monitor 60 to display a visual image. Note that when focusing is needed, the same operation as the aforementioned is performed.

If the foregoing preparation operation ends, the operator closes the door 25a of the black box 25, thereby shielding light from the black box 25. With this, within the black box 25, the reflecting manuscript (sample 11) is irradiated with the white LED light emitted from the white LED light source 45a. On the other hand, the camera controller 52 receiving the detection result from the door detection sensor 26 switches the read mode of the CCD 51 from the focus mode to the photograph mode. At this time, exposure is not started until the cooled temperature of the CCD 51 stabilizes at a constant temperature, as described above.

The sample 11 illuminated with the white LED light emits the reflected light carrying the reflected image corresponding to the image recorded on the reflecting manuscript (sample 11). This reflected light is formed onto the light-receiving surface of the CCD 51 through the small-diameter aperture 41a of the variable diaphragm 41 by the lens 40. The CCD 51 starts exposure and performs exposure by a predetermined exposure time period and reads out the reflected image photoelectrically. The read image signal is stored in the memory 72 of the PC 70 through the camera controller 52.

As described above, the detection signal from the sensor 22a representing the disposed position of the tray 10, the detection result from the filter detection sensor 47, the detection result from the diaphragm detection sensor 46, and the detection result from the illuminating-light switch means 44 have been input to the image-processing-condition determination means 73 of the PC 70. Based on these results, the image-processing-condition determination means 73 determines a condition for image processing to be performed by the image processing means 71.

More specifically, based on the detection result indicating that the exciting-light cut filter 42 has been removed from the optical path and the detection result indicating that the small-diameter aperture 41a of the diaphragm 41 has been disposed in the optical path, the image-processing-condition determination means 73 recognizes that the sample 11 is a sample for digitization. Furthermore, based on the detection result from the illuminating-light switch means 44, i.e., the result indicating that the illuminating-light switch means 44 has not been switched to the fluorescent lamp 45c, the image-processing-condition determination means 73 recognizes that the sample 11 is a reflecting manuscript.

In this way, the image-processing-condition determination means 73 determines an image processing condition such that the image processing by the image processing means 71 is image processing suitable for digitizing a reflecting manuscript. Furthermore, based on the detection result indicating that the tray 10 has been disposed on the tray rail 21a of the first row, the image-processing-condition determination means 73 determines an image processing condition, such as shading correction processing or flat frame correction processing.

The image processing condition determined here is a processing condition that shading correction is performed based on the flat frame data obtained by illuminating a reference sample, which has an even density, with the illuminating light of the white LED light source 45a without an exciting-light cut filter and with a diaphragm of 2.8 for each of the positions of the sample-tray disposing sections.

The image processing condition determined in the aforementioned manner is input to the image processing means 71, which in turn reads out an image signal stored in the memory 72 and processes this image signal in accordance with the image processing condition determined by the image-processing-condition determination means 73. The processed image signal is displayed, for example, on a CRT display, or is output for the subsequent processing such as quantitative analysis. Alternatively, it may be stored and archived in a storage medium such as a hard disk.

If photographing ends, the operator opens the door 25a to replace the tested sample with the next photographing sample. The open state of the door 25a is detected by the door detection sensor 26. As with the aforementioned preparatory operation, the camera controller 52 switches the read mode of the CCD 51 to the focus mode. In this open state, the CCD 51 photoelectrically reads out the image signal, which is in turn displayed on the monitor 60.

According to the photographing system of the present invention, as described in detail above, the photographing method set in the photographing apparatus by the operator, that is, the inserted or removed state of the exciting-light cut filter 42, the diaphragmed state of the variable diaphragm 41, the tray rail placing the tray 10 thereof, and the direction of the illuminating light are detected by the filter detection sensor 47, the diaphragm detection sensor 46, the tray rail detection sensors 22a to 22g, and the illumination switch means 44, respectively. Based on these results of detection, the image-processing-condition determination means 73 of the PC 70 recognizes the photographing method and the image processing means 71 determines an image processing condition for performing optimal image processing for each of the photographing methods. For this reason, there is no need to input one by one the contents of the photographing method set in the photographing apparatus 20 by the operator to the PC 70. Thus, in performing input by the keyboard or the like of the PC 70, erroneous input and labor of input can be omitted.

Note that the communication between the CCD 51 and the camera controller 52 in the photographing system 100 of the preferred embodiment is carried out using an RS232C interface, the communication between the camera controller 52, the monitor 60, and the PC 70 is carried out using a SCSI interface, and the communication between each detection sensor of the photographing apparatus 20 and the PC 70 is carried out using an RS232C interface.

In addition, while, in the photographing system 100 of the preferred embodiment, the detection result from each detection sensor of the photographing apparatus 20 is input directly to the PC 70, the present invention is not limited to the preferred embodiment. The detection result from each detection sensor may be input to the PC 70 through the camera controller 52. In this case, the communication between the camera controller 52 and each detection sensor of the photographing apparatus 20 is carried out using an RS232C interface.

Note that the photographing methods in the photographing system of the aforementioned embodiment, the conditions for image processing, and the image data previously prepared for setting the conditions for image processing are listed in the following Table 1.

TABLE 1

| Methods | chemiluminescence | fluorescence | digitization |
|---|---|---|---|
| Filter | none | exists | none |
| Diaphragm | 0.85 | 0.85 | 2.8 |
| Sample position | 7 rows | 7 rows | 7 rows |
| Image processing (flat frame) | none | performed | performed |
| Image processing (profile) | performed | none | none |
| Image processing data file to be previously prepared | one-dimensional profile data (lens density) | data of the first row through the seventh row obtained with a blue LED, a filter, and a diaphragm of 0.85 | data of the first row through the seventh row obtained with a white LED and a diaphragm of 0.85 and without a filter |

Although the photographing system described in detail above has been found to be most satisfactory and preferred, many variations in structure are possible. Because many variations and different embodiments may be made within the scope of the inventive concept herein taught, it should be understood that the details herein are to be interpreted as illustrative and not in a limiting sense.

What is claimed is:

1. A photographing system comprising:
a photographing apparatus including: (1) a lens movable in an optical axis direction; (2) a plurality of sample-tray disposing sections on which a sample tray holding a predetermined sample thereon is selectively disposed, said sample-tray disposing sections each having a different distance from said lens in said optical axis direction; (3) sample-tray disposing section detection means for detecting one sample-tray disposing section of said plurality of sample-tray disposing sections on which said sample tray has been disposed; (4) a light source provided so that it can switch emission and non-emission of exciting light or illuminating light with respect to said predetermined sample on said sample tray disposed on the detected sample-tray disposing section; (5) photoelectric reading means for photoelectrically reading out an image of said predetermined sample, formed on its light-receiving surface by said lens; (6) lens movement means for moving said lens in said optical axis direction in accordance with said one sample-tray disposing section detected by said sample-tray disposing section detection means such that the image of said predetermined sample is formed onto said light-receiving surface of said photoelectric reading means; (7) an exciting-light cut filter provided between said lens and said photoelectric reading means so that it can be inserted in or removed from an optical path of light constituting the image of said predetermined sample, said filter having bands set so as to transmit florescence emitted from said predetermined sample and prevent passage of said exciting light; (8) a variable diaphragm provided between said lens and said photoelectric reading means and in proximity to said lens; and (9) a black box shielded from light, said components (1) to (8) being housed inside said black box; and an image processing computer for performing predetermined image processing with respect to an image signal representing the image of said predetermined sample read out by said photoelectric reading means;

wherein said photographing system further comprises:
filter detection means for detecting an inserted or removed state of said exciting-light cut filter;
diaphragm detection means for detecting a diaphragmed state of said variable diaphragm; and
image processing condition determination means for determining a condition for said predetermined image processing to be performed by said image processing computer with respect to said image signal read out by said photoelectric reading means, in accordance with the inserted or removed state of said filter detected by said filter detection means, the diaphragmed state of said variable diaphragm detected by said diaphragm detection means; and said one sample-tray disposing section detected by said sample-tray disposing section detection means.

2. The photographing system as set forth in claim 1, wherein said photoelectric reading means is an interline type charged-coupled device equipped with a cooling element.

3. The photographing system as set forth in claim 1, further comprising a camera controller for controlling said photoelectric reading means so that photoelectric reading to be performed by said photoelectric reading means is switched to reading, which is performed reiteratively in a shorter time period than reading for said predetermined image processing, for outputting said image signal as a video signal.

4. The photographing system as set forth in claim 3, wherein said photoelectric reading means is an interline type charged-coupled device equipped with a cooling element.

5. The photographing system as set forth in claim 1, further comprising:

door detection means for detecting a closed or open state of a door formed in said black box; and a light source controller for switching on said light source independently of the inserted or removed state of said exciting-light cut filter when the open state of said door is detected by said door detection means.

6. The photographing system as set forth in claim 5, wherein said photoelectric reading means is an interline type charged-coupled device equipped with a cooling element.

7. The photographing system as set forth in claim 5, further comprising a camera controller for controlling said photoelectric reading means so that photoelectric reading to be performed by said photoelectric reading means is switched to reading, which is performed reiteratively in a shorter time period than reading for said predetermined image processing, for outputting said image signal as a video signal.

8. The photographing system as set forth in claim 7, wherein said photoelectric reading means is an interline type charged-coupled device equipped with a cooling element.

9. The photographing system as set forth in claim 1, further comprising interrelating means for interrelating switching of the emission and non-emission of said exciting light, which is performed by said light source, with the inserted or removed state of said exciting-light cut filter so that said exciting light is emitted when said exciting-light cut filter is in said optical path and is not emitted when said exciting-light cut filter is out of said optical path.

10. The photographing system as set forth in claim 9, wherein said photoelectric reading means is an interline type charged-coupled device equipped with a cooling element.

11. The photographing system as set forth in claim 9, further comprising a camera controller for controlling said photoelectric reading means so that photoelectric reading to be performed by said photoelectric reading means is switched to reading, which is performed reiteratively in a shorter time period than reading for said predetermined image processing, for outputting said image signal as a video signal.

12. The photographing system as set forth in claim 11, wherein said photoelectric reading means is an interline type charged-coupled device equipped with a cooling element.

13. The photographing system as set forth in claim 9, further comprising:

door detection means for detecting a closed or open state of a door formed in said black box; and a light source controller for switching on said light source independently of the inserted or removed state of said exciting-light cut filter when the open state of said door is detected by said door detection means.

14. The photographing system as set forth in claim 13, wherein said photoelectric reading means is an interline type charged-coupled device equipped with a cooling element.

15. The photographing system as set forth in claim 13, further comprising a camera controller for controlling said photoelectric reading means so that photoelectric reading to be performed by said photoelectric reading means is switched to reading, which is performed reiteratively in a shorter time period than reading for said predetermined image processing, for outputting said image signal as a video signal.

16. The photographing system as set forth in claim 15, wherein said photoelectric reading means is an interline type charged-coupled device equipped with a cooling element.

* * * * *